(12) United States Patent
McCormack (10) Patent No.: US 9,506,571 B1
(45) Date of Patent: Nov. 29, 2016

(54) CRYOGENIC CAM BUTTERFLY VALVE

(71) Applicant: The United States of America as Represented by the Adminstrator of the National Aeronautics and Space Administration, Washington, DC (US)

(72) Inventor: Kenneth J. McCormack, Slidell, LA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 112 days.

(21) Appl. No.: 14/463,238

(22) Filed: Aug. 19, 2014

Related U.S. Application Data (60) Provisional application No. 61/867,190, filed on Aug. 19, 2013.

(51) Int. Cl.
*F16K 31/524* (2006.01)
*F16K 1/22* (2006.01)
*F17C 13/04* (2006.01)

(52) U.S. Cl.
CPC ............. *F16K 1/221* (2013.01); *F16K 31/524* (2013.01); *F17C 13/04* (2013.01)

(58) Field of Classification Search
CPC .................................................. F16K 31/524
USPC ................ 251/160, 162, 163, 180, 192, 305
See application file for complete search history.

(56) References Cited

U.S. PATENT DOCUMENTS

| | | | |
|---|---|---|---|
| 3,077,331 A | 5/1959 | Burtis | |
| 3,077,332 A | 2/1960 | Burtis | |
| 3,156,445 A | 9/1964 | Swain | |
| 3,260,496 A | 7/1966 | Borcherdt | |
| 3,587,631 A * | 6/1971 | Dern | F16K 15/03 137/527 |
| 3,902,694 A | 9/1975 | Friedell | |
| 4,042,173 A * | 8/1977 | Boyer | F24F 11/04 137/486 |
| 4,204,408 A * | 5/1980 | Dawson | A21D 15/02 34/559 |
| 4,770,392 A * | 9/1988 | Schmidt | F16K 1/24 251/158 |
| 4,921,212 A | 5/1990 | deQuay | |
| 5,330,157 A * | 7/1994 | Dern | F16K 1/24 251/162 |
| 2010/0206406 A1* | 8/2010 | Nakamura | F02M 25/074 137/544 |
| 2011/0036408 A1* | 2/2011 | Desai | F16K 15/063 137/1 |
| 2011/0042599 A1* | 2/2011 | Arai | F16K 1/2263 251/251 |

OTHER PUBLICATIONS

"Post-Seal Type A431A Cryogenic High Performance Butterfly Valve," Feb. 2005, http://www.documentation.emersonprocess.com/groups/public/documents/instruction_manuals/d500242x012.pdf.

(Continued)

*Primary Examiner* — Kevin Murphy
*Assistant Examiner* — Paul J Gray (57) ABSTRACT

A cryogenic cam butterfly valve has a body that includes an axially extending fluid conduit formed there through. A disc lug is connected to a back side of a valve disc and has a circular bore that receives and is larger than a cam of a cam shaft. The valve disc is rotatable for a quarter turn within the body about a lug axis that is offset from the shaft axis. Actuating the cam shaft in the closing rotational direction first causes the camming side of the cam of the cam shaft to rotate the disc lug and the valve disc a quarter turn from the open position to the closed position. Further actuating causes the camming side of the cam shaft to translate the valve disc into sealed contact with the valve seat. Opening rotational direction of the cam shaft reverses these motions.

19 Claims, 8 Drawing Sheets

(56) References Cited

OTHER PUBLICATIONS

"Cryogenic Butterfly Valves," http://www.everestvalveusa.com/cryogenic-valves.html, accessed Jun. 23, 2014.

"Butterfly valve," http://en.wikipedia.org/wiki/Butterfly_valve, accessed Jun. 23, 2014.

"Globe valve," http://en.wikipedia.org/wiki/Globe_valve, accessed Jun. 23, 2014.

* cited by examiner

FIG. 3
VIEW A-A

FIG. 4
VIEW B-B

FIG. 5
VIEW B-B

FIG. 9
VIEW C-C (Full Open)

*FIG. 10*
VIEW C-C (Full Closed)

FIG. 11
VIEW C-C (Fully Sealed)

CRYOGENIC CAM BUTTERFLY VALVE

CROSS-REFERENCE TO RELATED APPLICATIONS

This application claims the benefit of priority under 35 U.S.C. §119(e) to U.S. Provisional Application Ser. No. 61/867,190 entitled "Cryogenic Cam Butterfly Valve," filed Aug. 19, 2013, the contents of which are incorporated herein by reference in its entirety.

ORIGIN OF THE INVENTION

The invention described herein was made in the performance of work under a NASA contract and is subject to the provisions of 51 U.S.C. §20135.

BACKGROUND OF THE INVENTION

1. Technical Field

The present invention generally relates to fluid stop valves, and more particularly to a butterfly valve that can effectively operate across a wide range of temperatures including cryogenic temperatures.

2. Description of the Related Art

A generally-known butterfly valve is a valve which can be used for isolating or regulating flow. The closing mechanism takes the form of a disc. Operation is similar to that of a ball valve, which allows for quick shut off. Butterfly valves are generally favored because they are lower in cost to other valve designs as well as being lighter in weight, meaning less support is required. The disc is positioned in the center of the pipe. Passing through the disc is a rod connected to an actuator on the outside of the valve. Rotating the actuator turns the disc either parallel or perpendicular to the flow. Unlike a ball valve, the disc is always present within the flow. Therefore a pressure drop is always induced in the flow, regardless of valve position. A butterfly valve is from a family of valves called quarter-turn valves. In operation, the valve is fully open or closed when the disc is rotated a quarter turn. The "butterfly" is a metal disc mounted on a rod. When the valve is closed, the disc is turned so that it completely blocks off the passageway. When the valve is fully open, the disc is rotated a quarter turn so that it allows an almost unrestricted passage of the fluid. The valve may also be opened incrementally to throttle flow.

The high flow rate and relatively low pressure drop at full flow are some of the advantages that butterfly valves have over other valves. Other advantages include simplicity of operation, compact valve body and relatively low cost. However, balanced against these advantages butterfly valves have high valve seat wear and inability to maintain a tight seal. Additionally, if the valve is used to throttle the fluid flow or to frequently cycle to open and closed positions, these disadvantages are amplified and additionally frequent repair is required. Therefore a need exists for a butterfly valve with improved sealing characteristics, and in particular for cryogenic applications.

BRIEF SUMMARY OF THE INVENTION

In one aspect, the present invention provides a cam butterfly valve that includes a body including an axially extending fluid conduit formed there through. A valve seat projects from the body annularly within the fluid conduit. A cam shaft has a cam of circular cross section, disposed transverse to an axis of the fluid conduit, and journally mounted within the body to rotate about a shaft axis. A valve disc has a seating surface that corresponds in a closed position to the valve seat of the body. A disc lug is connected to a back side of the valve disc and has a circular bore that receives and is larger than the cam of the cam shaft. The valve disc is rotatable for a quarter turn within the body about a lug axis that is offset from the shaft axis. Actuating the shaft in the closing rotational direction first causes the camming side of the cam of the cam shaft to rotate the disc lug and the valve disc a quarter turn from the open position to the closed position. Further actuating causes the camming side of the shaft to translate the valve disc into sealed contact with the valve seat. Actuating the shaft in an opening rotational direction first causes the camming side of the cam of the cam shaft to reverse translate the valve disc to unseal from the valve seat. Continued actuating causes the camming side of the shaft to reverse rotate the disc lug and valve disc a quarter turn from the closed position to the open position.

In another aspect, the present invention provides a cryogenic cam butterfly valve having a body that includes an axially extending fluid conduit formed there through. A valve seat projects from the body annularly within the fluid conduit. A cam shaft has a cam of circular cross section, is disposed transverse to an axis of the fluid conduit, and is journally mounted within the body to rotate about a shaft axis. A valve disc has a seating surface that corresponds in a closed position to the valve seat of the body. A disc lug is connected to a back side of the valve disc and having a circular bore that receives and is larger than the cam of the cam shaft. The valve disc is rotatable for a quarter turn within the body about a lug axis that is offset from the shaft axis. At least one torsion spring is mounted concentrically on the cam shaft with one spring leg against the valve disc with a preloaded of sufficient torque to cause the valve disc to rigidly move with the cam shaft. A biasing mechanism is operatively coupled to the shaft. Actuating the shaft in the closing rotational direction first causes the camming side of the cam of the cam shaft to rotate the disc lug and the valve disc a quarter turn from the open position to the closed position. Further actuating causes the camming side of the shaft to translate the valve disc into sealed contact at an ambient temperature with the valve seat. The biasing mechanism asserts a closing bias rotation to the cam shaft to cause additional translation to maintain the sealed contact during cool down to a cryogenic temperature. Actuating the shaft in an opening rotational direction first causes the camming side of the cam of the cam shaft to reverse translate the valve disc to unseal from the valve seat and continued actuating causes the camming side of the shaft to reverse rotate the disc lug and valve disc a quarter turn from the closed position to the open position.

The above summary contains simplifications, generalizations, and omissions of detail and is not intended as a comprehensive description of the claimed subject matter but, rather, is intended to provide a brief overview of some of the functionality associated therewith. Other systems, methods, functionality, features, and advantages of the claimed subject matter will be, or will become, apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present invention are shown and described with respect to the figures presented herein, in which.

DETAILED DESCRIPTION OF THE INVENTION

The present invention relates to valves and, more particularly, to a cam butterfly valve having a rotatable and slidable closure disk that provides the full flow advantages of a butterfly valve and the throttling and sealing advantages of globe and needle valves. The cam butterfly valve has particular application to cryogenic fluid transfer systems wherein the temperature range can vary between ambient temperatures and cryogenic temperatures. The ability of the cam butterfly valve to translate its valve disc into sealing contact with a valve seat overcomes dimensional changes within the valve due to a significant change in temperature. This ability to translate like globe and needle valves provides good sealing and throttling capability because the valve disc or plug position can be closely regulated. Furthermore, because of the linear movement of the valve disc and its ability to be closely positioned within the valve seat, good sealing can be obtained.

A typical configuration for a butterfly valve consists of a 'butterfly' disc mounted to a shaft, which is then mounted in the valve body. The shaft is rotated by an actuator, which can be operated manually by a hand wheel, or by other mechanical means, such as an electric motor or hydraulic/pneumatic cylinders. The butterfly disc rotates 90° to control the flow of fluid through the valve. Thus, a generally-known butterfly has a quarter turn (90°) actuator wherein a valve disk can only rotate. The valve disk is pinned rigidly to a plain shaft.

The main problem with most typical butterfly valves is that they cannot seal at both ambient and cryogenic temperatures. The vast temperature differences that a cryogenic valve encounters makes the valve grow and shrink, which changes critical valve dimensions, such as the distance between the disc and seat. The valve must be able to compensate for these changing dimensions or it will not be able to hold tight seat leakage (i.e., will not prevent leaks when closed) throughout the temperature range. In order to address wear and dimensional changes due to temperature, some generally-known butterfly valves attempt to compensate for this challenge by including dynamic and complex seals for cryogenic applications.

The lack of a reliable cryogenic butterfly valve resulted in the need for a new, novel valve design which provides a better seal in cryogenic environments. The Cryogenic Cam Butterfly Valve (hereinafter "CCBV") met this need. The CCBV can hold tight seat leakage no matter how drastic the dimensional changes are due to changing operating temperatures because the valve disc can translate in addition to rotating.

In the following detailed description of exemplary embodiments of the invention, specific exemplary embodiments in which the invention may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present invention. It is also to be understood that other embodiments may be utilized and that logical, architectural, programmatic, mechanical, electrical and other changes may be made without departing from general scope of the invention. The following detailed description is, therefore, not to be taken in a limiting sense, and the scope of the present invention is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations to the described embodiments. The embodiments may thus be described with different nomenclature and/or terminology utilized to describe the components, devices, parameters, methods, and/or functions herein, without limitation. References to any specific protocol or proprietary name in describing one or more elements, features, or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
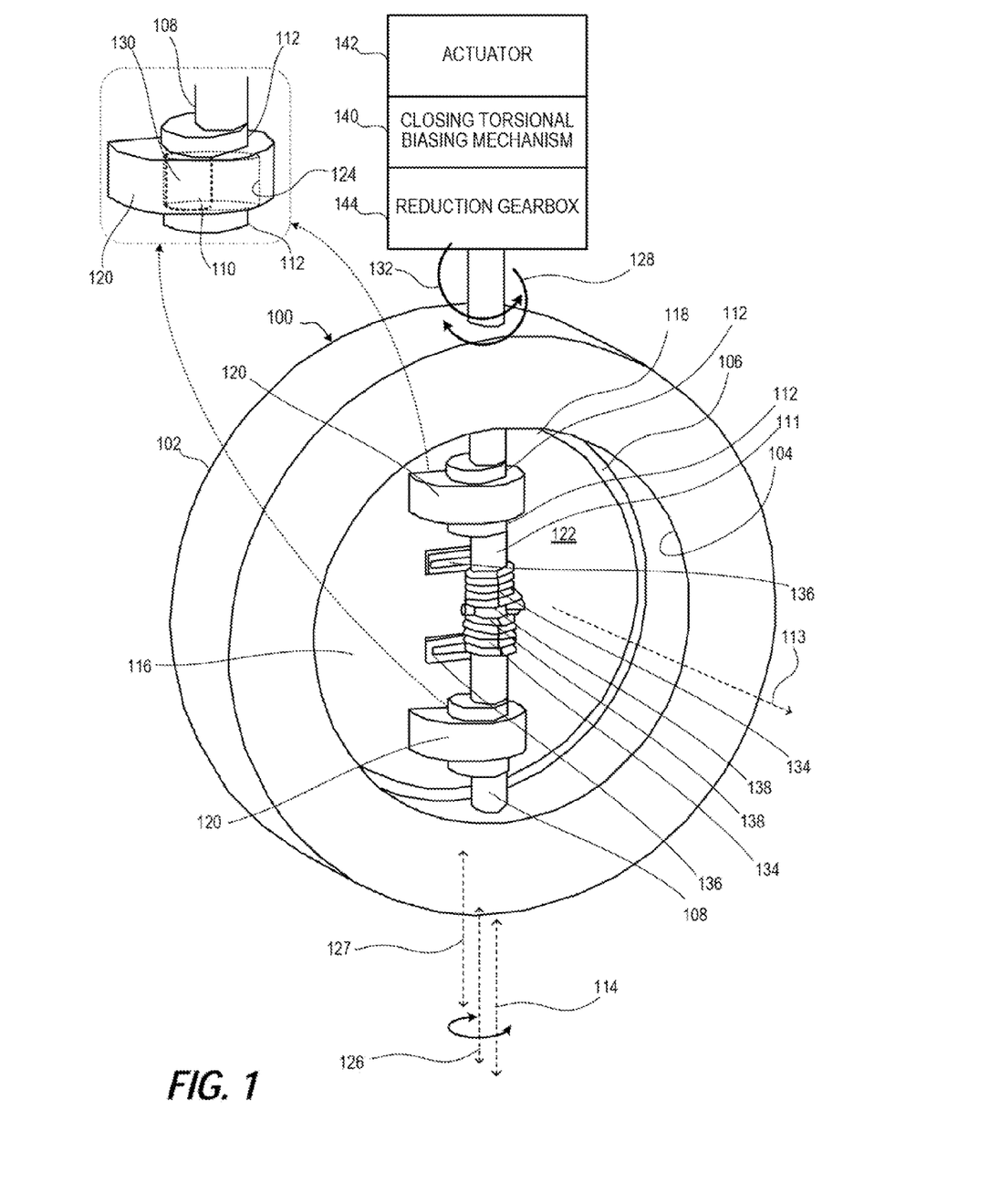
FIG. 1 illustrates an isometric view of a cam butterfly valve, according to one embodiment.

In FIG. 1, a cam butterfly valve 100 according to aspects of the present invention provides a quarter turn for closing with additional translation for tight sealing even in cryogenic applications. In one embodiment, a cam butterfly valve 100 has a body 102 that includes an axially extending fluid conduit 104 formed there through. A valve seat 106 projecting from the body annularly within the fluid conduit 104. A cam shaft 108 has a cam 110 of circular cross section attached to a central stem 111 between a pair of shaft lobes 112. The cam shaft 108 is disposed transverse to a flow axis 113 of the fluid conduit, and journally mounted within the body 102 to rotate about a shaft axis 114. A valve disc 116 has a seating surface 118 that corresponds in a closed position to the valve seat 106 of the body 102. A disc lug 120 is connected to a back side 122 of the valve disc 116 and has a circular bore 124 that receives and is larger than the cam 110 of the cam shaft 108. The valve disc 116 is rotatable for a quarter turn within the body 102 about a lug axis 126 that is offset from the shaft axis 114.

In one embodiment, the valve disc 116 is a triple offset design with the cam shaft 108 offset from a plane made from the seating surface 118. The shaft axis 114 is offset from a body centerline 127 of the body 102. The seating surface 118 on the valve disc 116 has a slanted cone shape.

Actuating the cam shaft 108 in the closing rotational direction 128 first causes the camming side 130 of the cam 110 of the cam shaft 108 to rotate the disc lug 120 and the valve disc 116 a quarter turn from the open position to the closed position. Further actuating of the cam shaft 108 causes the camming side 130 of the cam shaft 108 to translate the valve disc 116 into sealed contact with the valve seat 106.

Actuating the cam shaft 108 in an opening rotational direction 132 first causes the camming side 130 of the cam 110 of the cam shaft 108 to reverse translate the valve disc 116 to unseal from the valve seat 106. Continued actuating of the cam shaft 108 causes the camming side 130 of the cam shaft 108 to reverse rotate the disc lug 120 and the valve disc 116 a quarter turn from the closed position to the open position. In one embodiment, the cam butterfly valve 100 has a second disc lug 120 that contains a second cam 110 of the cam shaft 108 that is identical to and operates in unison with the cam 110.

At least one torsion spring 134 is mounted concentrically on the cam shaft 108 with one spring leg 136 against the valve disc 116 and another spring leg 138 attached to the cam shaft 108. Each torsion spring 134 is preloaded with sufficient torque to cause the valve disc 116 to rigidly move with the cam shaft 108. For cryogenic applications, each torsion spring 134 can be formed from an austenitic nickel-chromium-based superalloy (e.g., INCONEL).

In one embodiment, the cam butterfly valve 100 is for transferring a cryogenic fluid. Further actuating of the cam shaft 108 after the quarter turn causes the camming side 130 of the cam 110 to translate the valve disc 116 a first amount into sealed contact with the valve seat 106 at an ambient temperature and to translate the valve disc 116 a second amount into sealed contact with the valve seat 106 at a cryogenic temperature.

In one or more embodiments, a closing torsional biasing mechanism 140 is operatively coupled to the cam shaft 108 to assert a closing bias rotation to the cam shaft 108 to cause additional translation to maintain the sealed contact during cool down to a cryogenic temperature. In one embodiment, the biasing mechanism 140 can include or wholly comprise an additional torsion spring (not shown) that urges the cam shaft 108 to rotate toward closing. In a particular embodiment, the biasing mechanism 140 is a torsion spring that is utilized in an actuator 142 between a worm gear (not shown) and the cam shaft 108 upstream of a reduction gearbox 144 to maintain a sufficient torque on the cam shaft 108 during cryogenic chill down. The reduction gearbox 144 is connected to the actuator 142 (e.g., a manual hand wheel or motorized actuator). The reduction gearbox 144 provides significant mechanical advantage to an operator (e.g., ten (10) full rotations of the hand wheel equals 90° of rotation of the cam shaft 108). The biasing mechanism 140 can receive the benefit of this mechanical advantage to eliminate, or at least significantly reduce, the need to continually apply torque to the actuator 142, such as a hand wheel, during temperature changes to maintain a leak tight seat.

FIGS. 2-7 illustrate an exemplary embodiment of a cryogenic cam butterfly valve (CCBV) 200 that includes a valve body 202, valve disc 216, cam shaft 208, torsion spring 234, and 180° operation manual actuator 242. A valve seat 206 is a simple static valve seat. In an exemplary embodiment, a valve body 202, valve disc 216, and cam shaft 208 are fabricated from 304 or 316 stainless steel while the torsion spring 234 is made of austenitic nickel-chromium-based superalloy. The operating temperatures of the CCBV 200 can be from −320° F. to +200° F. The CCBV 200 can be assembled similar to a typical butterfly valve. In the full open position, disc rotation is "0 degrees" and the valve disc 216 is approximately perpendicular to the valve body 202 to allow maximum fluid flow through the CCBV 200. Unlike a typical butterfly valve where the valve disc is pinned to the shaft, the CCBV 200 has a preloaded torsion spring 234 mounted concentrically on the cam shaft 208 with one spring leg 236 against the valve disc 216 and another spring leg 238 attached to the cam shaft 208 by a pin 239. The torsion spring 234 is preloaded with sufficient torque to cause the assembly of the valve disc 216 and cam shaft 208 to act like the valve disc 216 is rigidly pinned to the cam shaft 208.

Figure 2:
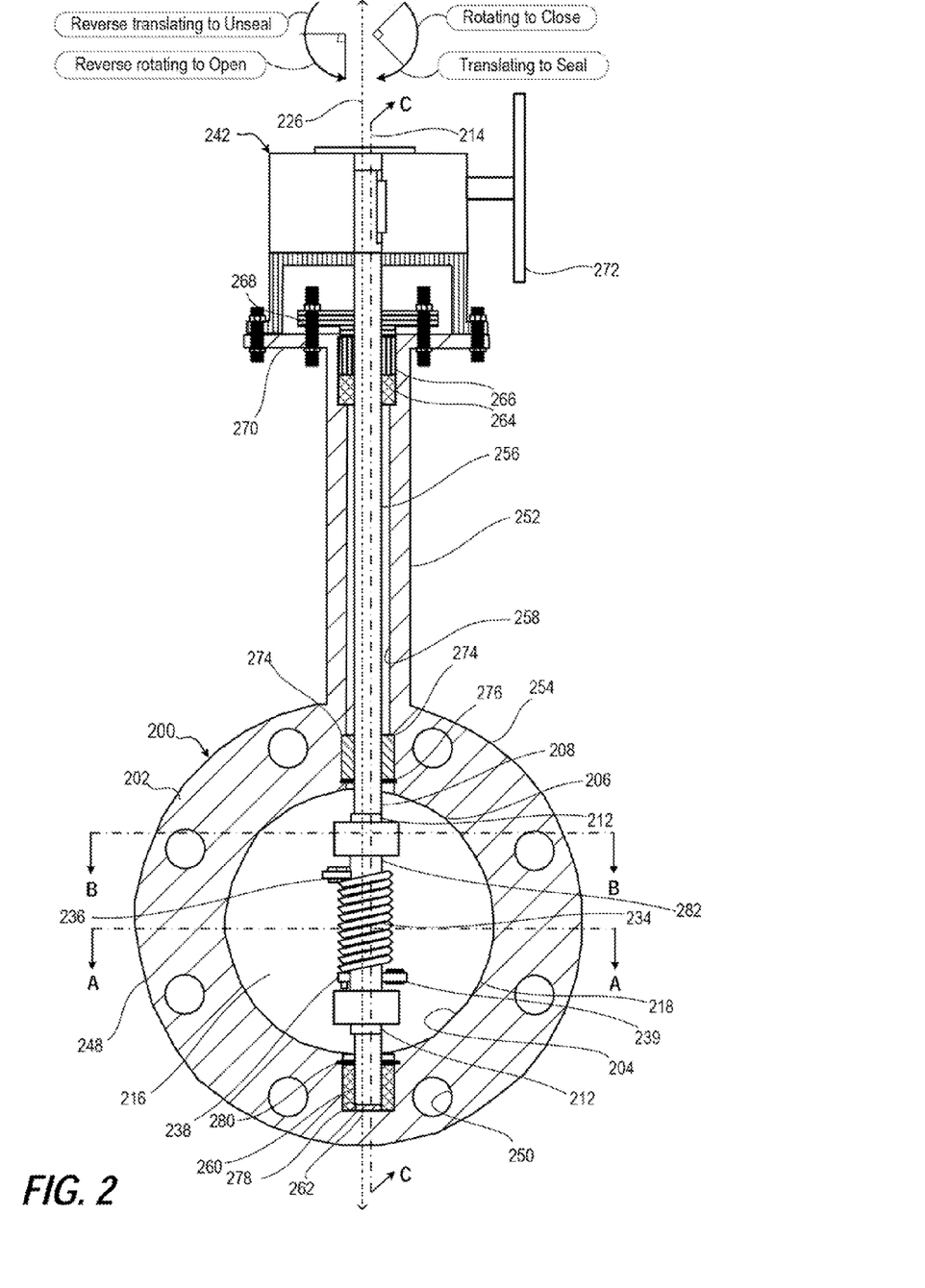
FIG. 2 illustrates a side view of a cam butterfly valve having a valve housing particularly cutaway to expose a valve disc and cam shaft, according to one embodiment.

With particular reference to FIGS. 2 and 9-11, CCBV 200 including mounting flanges 248 having radially spaced through holes 250. The valve body 202 includes an extended neck 252 from a main body 254 that defines a fluid conduit 204. With particular reference to FIG. 2, an upper shaft portion 256 of the cam shaft 208 is received for rotation within an upward bore 258. A shorter lower shaft portion 260 of the cam shaft 208 is received into a downward bore 262 formed in the main body 254. The upper shaft portion 256 is dynamically sealed and supported in the upward bore 258 by an upper guide 264. The upper guide 264 is held from above by packing assembly 266 that is in turn retained by a top hat collar 268 fastened to a top horizontal flange 270 of the extended neck 252. The upper shaft portion 256 extends upwardly out of the top hat collar 268 to be received in a operation manual actuator 242 that is also fastened to the top horizontal flange 270 and that is manually operated by a hand wheel 272. The upper shaft portion 256 is supported at a lower end of the upward bore 258 by a middle guide 274 kept up by a retaining ring 276. The shorter lower shaft portion 260 is dynamically guided for rotation by a lower guide 278 held in the downward bore 262 by a retaining ring 280.

Figure 3:
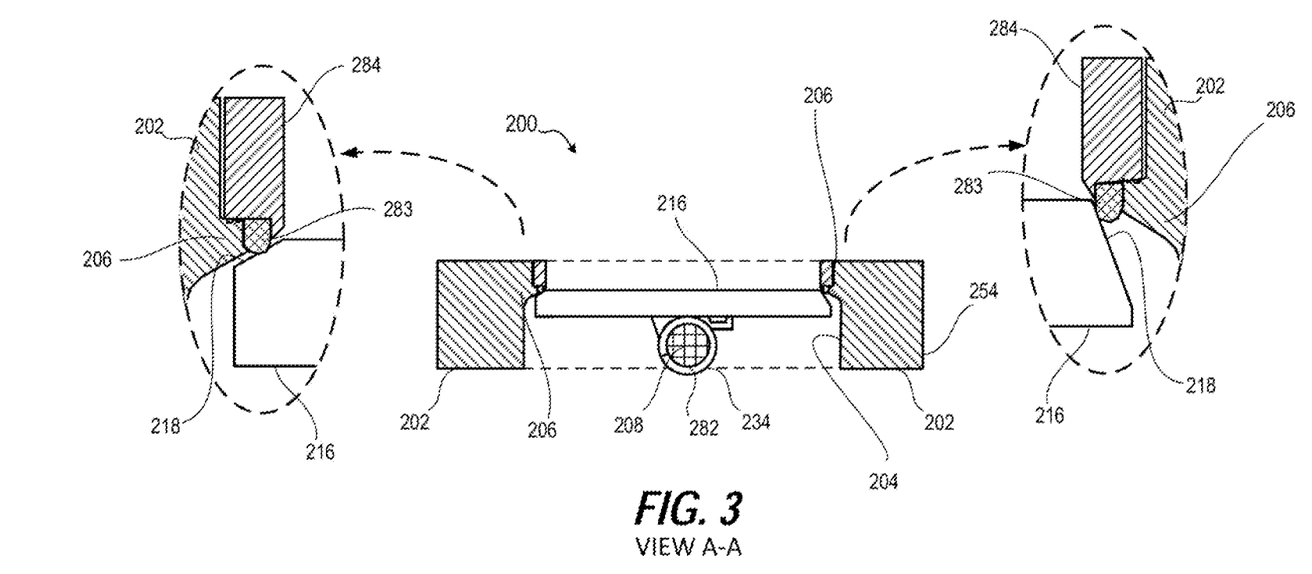
FIG. 3 illustrates a top view of the cam butterfly valve of FIG. 2 cut away along lines A-A and including left and right detail views of left and right sealed contacts between a valve seat and a valve disc, according to one embodiment.

With particular reference to FIG. 3, a central stem portion 282 of the cam shaft 208 concentrically receives the torsion spring 234. The valve disc 216 presents a chamfered edge as a seating surface 218 to a valve seat 206, which is a simple, static valve seat of a conical ring attached to the valve body.

To ensure a tight seal, a downstream sealing ring 283 is positioned to contact the seating surface 218 and is attached by a retaining collar 284. The valve seat 206 can be a static "chunk" design. The valve seat 206 can be asymmetrical with one side seating first with an angle more in opposition to the sealing ring 283 and the other side of the seating surface 218 more tangentially contacting for sliding along during translation of the valve disc 216.

Figure 4:
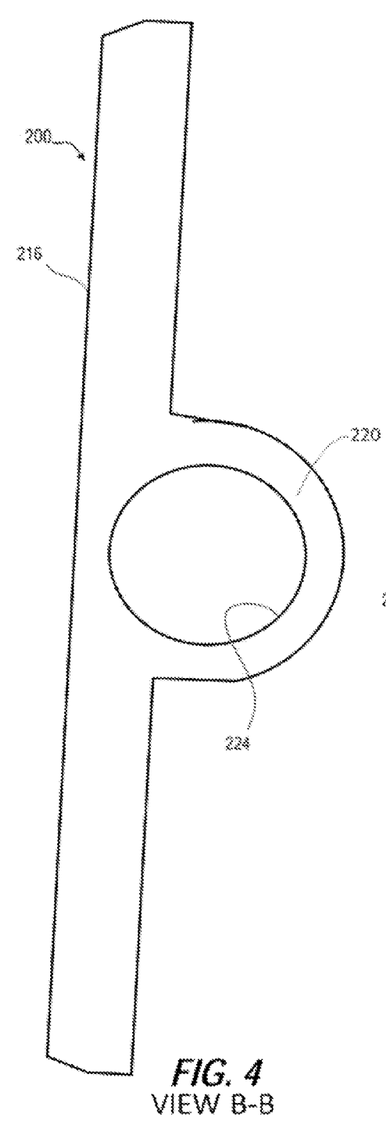
FIG. 4 illustrates a top view of a valve disc taken in cross section through a disc lug along lines B-B of FIG. 2, according to one embodiment.
Figure 5:
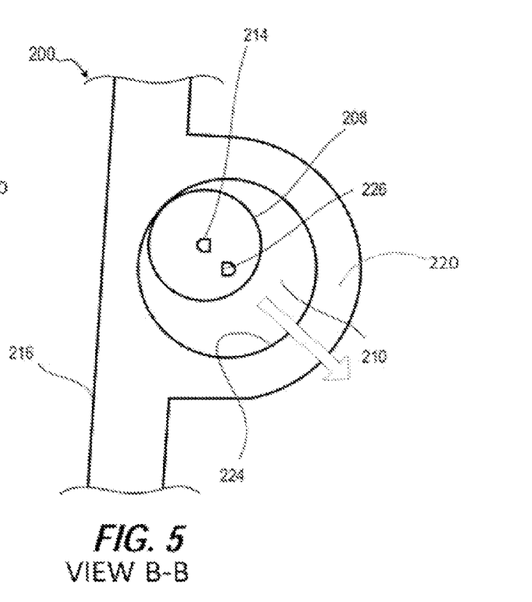
FIG. 5 illustrates a detail view of a circular bore of a disc lug and a cam taken in cross section along lines B-B of FIG. 2, according to one embodiment.
Figure 6:
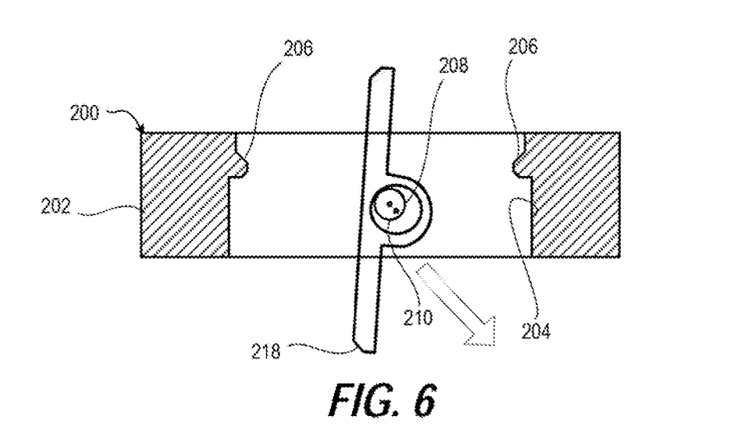
FIG. 6 illustrates a diagrammatic view of the cam butterfly valve of FIG. 2 in a full open (0°) position, according to one embodiment.
Figure 7:
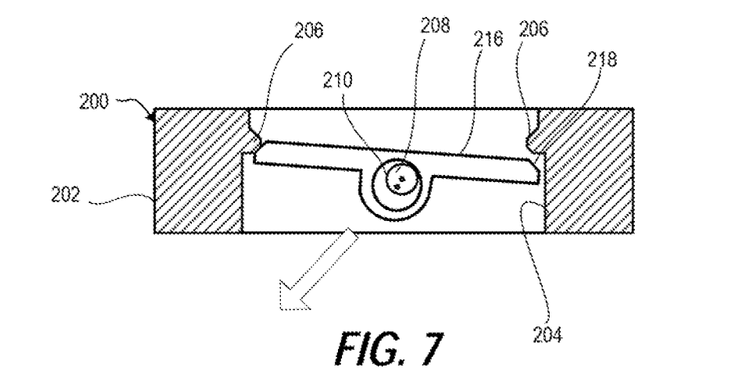
FIG. 7 illustrates a diagrammatic view of the cam butterfly valve of FIG. 2 in a closed (90°) position after a quarter turn, according to one embodiment.
Figure 8:
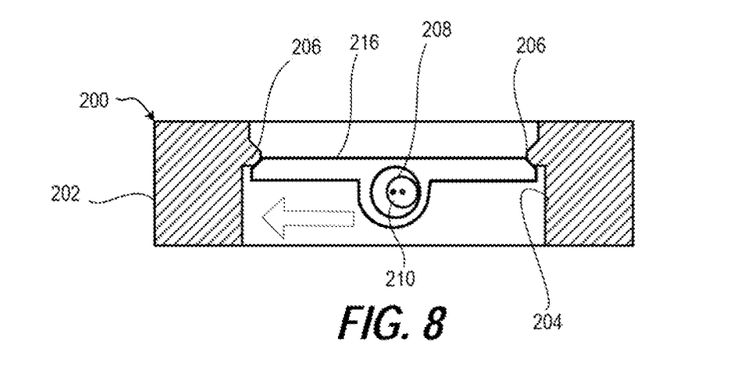
FIG. 8 illustrates a diagrammatic view of the cam butterfly valve of FIG. 2 in a sealed (~135°) position after further closing actuation, according to one embodiment.

FIG. 4 illustrates a circular bore 224 of a disc lug 220 attached to the valve disc 216. FIG. 5 illustrates a cam 210 of the cam shaft 208 having a shaft axis 214 that is offset from a lug axis 226. FIG. 6 illustrates the CCBV 200 in a full open (0°) position. FIG. 7 illustrates the CCBV 200 in a closed (90°) position after a quarter turn. The first 90° of the actuator and shaft rotation rotates the valve disc 216, just like a typical butterfly valve. The valve disc 216 can be a lug type, similar to a Royal valve disc, so that the cam shaft 208 is accessible between the disc lugs 220. FIG. 8 illustrates the CCBV 200 in a sealed (~135°) position after further closing actuation. All actuator and shaft rotation beyond 90° translates the valve disc 216 towards the valve seat 206 to create a tighter seal, in a similar manner as a globe valve. Seat leakage when the CCBV 200 is in this position will be reduced and most likely stopped by additional actuator rotation. In particular, in FIG. 7 the edge of the valve disc 216 initially contacts the valve seat 206 at the "9 o'clock" point, continually making a tight seal all around the valve disc 216 to the "3 o'clock" point as the cam shaft 208 is increasingly rotated past the "90 degree" position. The valve disc 216 can be a triple offset design with the shaft offset from the plane made from the seating surface 218, the shaft axis offset from the body centerline, and the seating surface on the disc having a slanted cone shape. The cam shaft lobes 212 are circular and are supported by bushings (not shown) inside the disc lugs 220.

Figure 9:
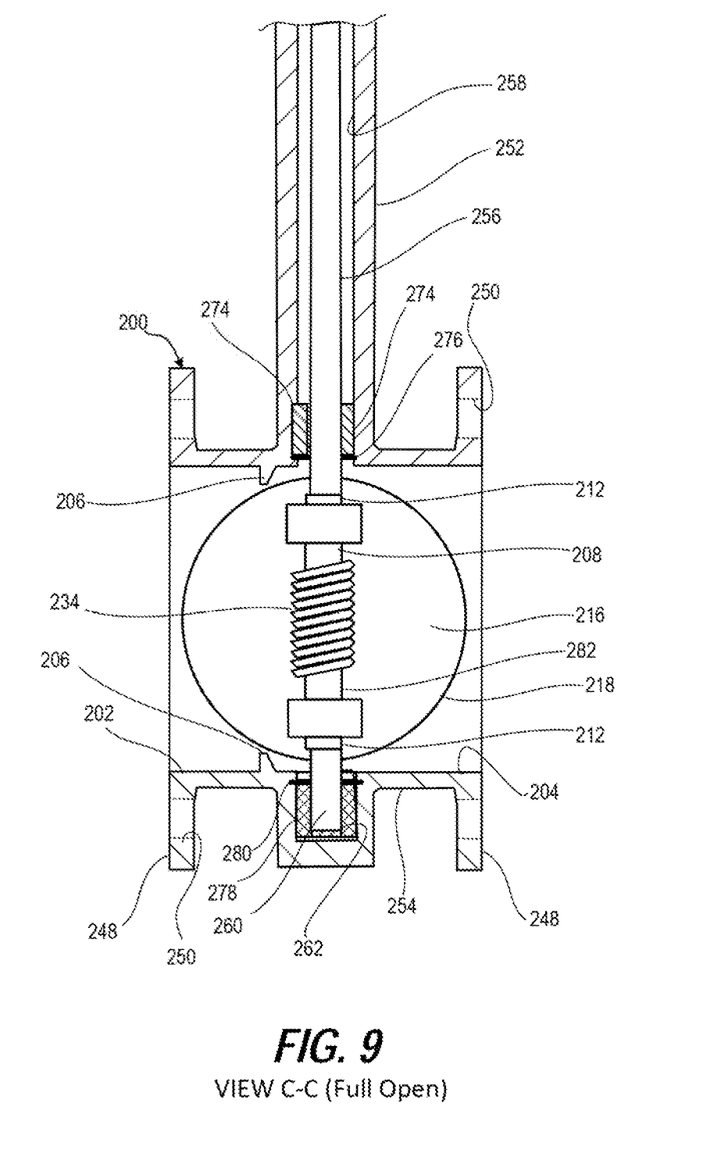
FIG. 9 illustrates a left side view of the cam butterfly valve in a full open (0°) position cut away along lines C-C of FIG. 2, according to one embodiment.
Figure 10:
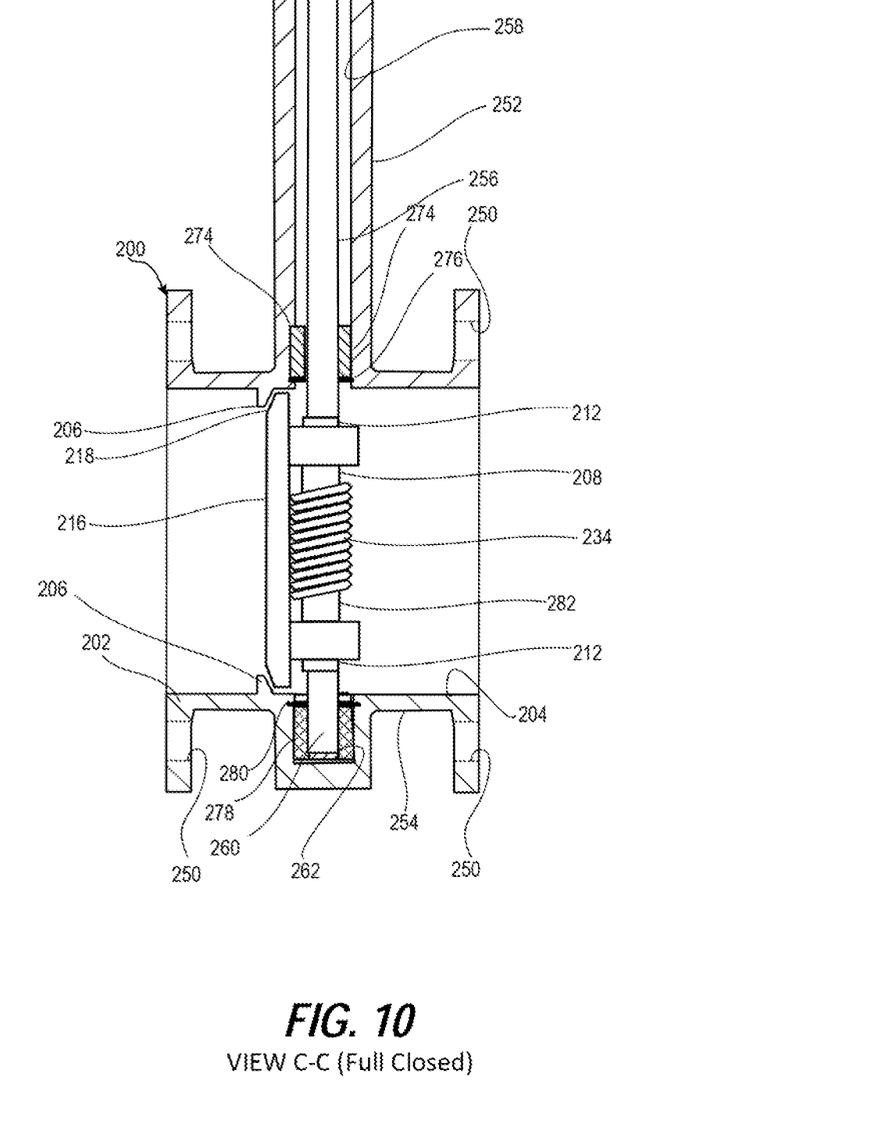
FIG. 10 illustrates a left side view of the cam butterfly valve in a full closed (90°) position cut away along lines C-C of FIG. 2, according to one embodiment.
Figure 11:
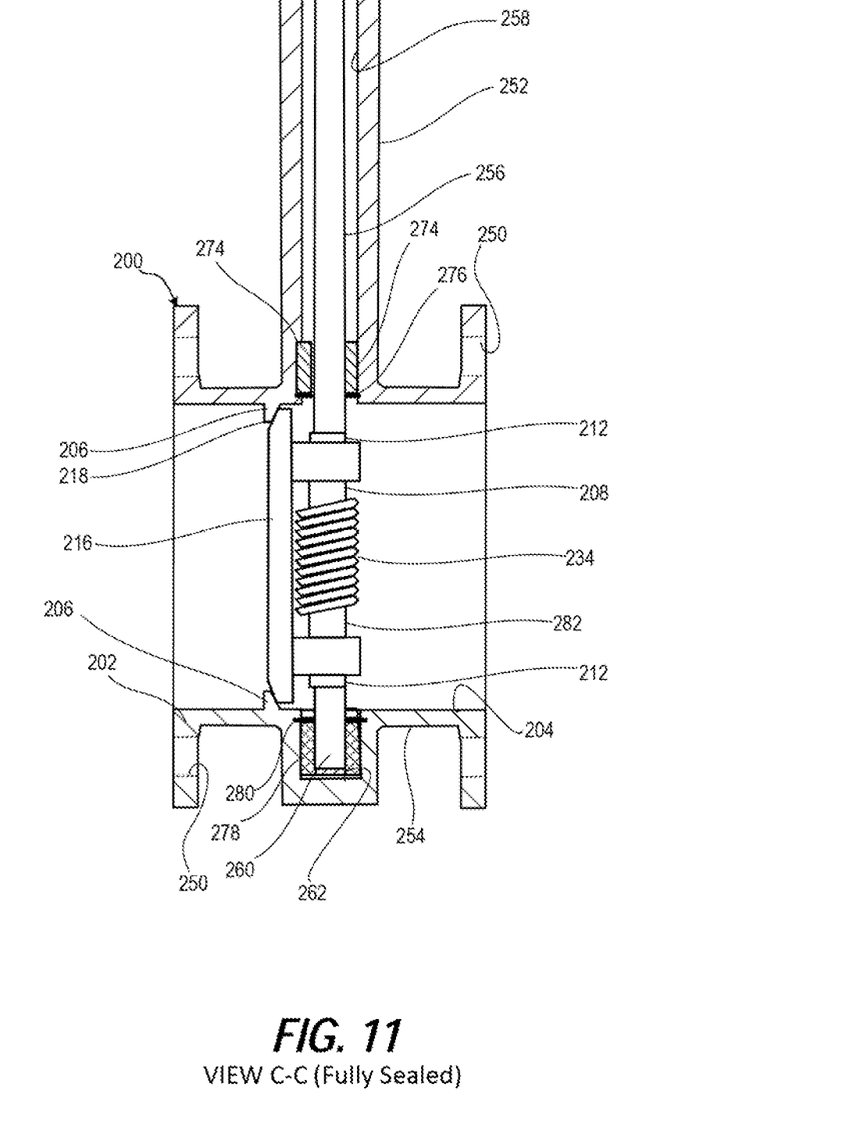
FIG. 11 illustrates a left side view of the cam butterfly valve in a sealed (~135°) position cut away along lines C-C of FIG. 2, according to one embodiment.

FIGS. 9-11 correspond respectively to FIGS. 6-8 illustrating respectively the CCBV 200 in a full open (0°) position, in a full closed (90°) position, and in a sealed (~135°) position.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the specification without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. does not denote any order or importance, but rather the terms first, second, etc. are used to distinguish one element from another.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the disclosure in the form disclosed. Many modifications and variations will be apparent to those of ordinary skill in the art without departing from the scope of the invention. The described embodiments were chosen and described in order to best explain the principles of the invention and the practical application, and to enable others of ordinary skill in the art to understand the invention for various embodiments with various modifications as are suited to the particular use contemplated.

I claim:

1. A cam butterfly valve, comprising:
    a body including an axially extending fluid conduit formed there through;
    a valve seat projecting from the body annularly within the fluid conduit;
    a cam shaft having a cam of circular cross section, disposed transverse to an axis of the fluid conduit, and mounted within the body to rotate about a shaft axis;
    a valve disc having a seating surface that corresponds in a closed position to the valve seat of the body;
    a disc lug connected to a back side of the valve disc and having a circular bore that receives and is larger than the cam of the cam shaft, the valve disc rotatable for a quarter turn within the body about a lug axis that is offset from the shaft axis; and
    at least one torsion spring mounted concentrically on the cam shaft with one spring leg against the valve disc having a preload of sufficient torque to cause the valve disc to rigidly move with the cam shaft;
    wherein actuating the cam shaft in the closing rotational direction first causes the camming side of the cam of the cam shaft to rotate the disc lug and the valve disc a quarter turn from the open position to the closed position and further actuating causes the camming side of the cam shaft to translate the valve disc into sealed contact with the valve seat, said valve disc being translated by the force of the valve disc against the valve seat; and
    Wherein actuating the cam shaft in an opening rotational direction first causes the camming side of the cam of the cam shaft to reverse translate the valve disc to unseal from the valve seat and continued actuating causes the caroming side of the cam shaft to reverse rotate the disc lug and valve disc a quarter turn from the closed position to the open position.

2. The cam butterfly valve of claim 1, wherein the at least one torsion spring comprises an austenitic nickel-chromium-based superalloy.

3. The cam butterfly valve of claim 1, wherein the cam shaft has a second cam of circular cross section that moves in unison with the first cam, the cam butterfly valve further comprising a second disc lug connected to a back side of the valve disc and having a circular bore that receives and is larger than the second cam of the cam shaft, the valve disc rotatable for a quarter turn within the body about the lug axis that is offset from the shaft axis.

4. The cam butterfly valve of claim 1, wherein the valve disc comprises a triple offset design with the cam shaft offset from a plane made from the seating surface, wherein the shaft axis is offset from a body centerline of the body, and wherein the seating surface on disc has a slanted cone shape.

5. The cam butterfly valve of claim 1, wherein the valve seat comprises a static valve seat.

6. The cam butterfly valve of claim 5, wherein the static valve seat comprises a conical ring attached to the valve body.

7. The cam butterfly valve of claim 1, wherein the fluid conduit contains a cryogenic fluid, wherein further actuating of the cam shaft causes the camming side of the cam shaft to translate the valve disc a first amount into sealed contact with the valve seat at an ambient temperature and to translate the valve disc a second amount into sealed contact with the valve seat at a cryogenic temperature.

8. The cam butterfly valve of claim 1, wherein the body, the valve disc and the cam shaft comprise stainless steel.

9. The cam butterfly valve of claim 1, wherein actuating the cam shaft comprises a rotation of 0-90° and further actuating the cam shaft comprises an additional rotation of 90° to approximately 135° to thereby translate the valve disc towards the valve seat thereby creating a tight seal.

10. The cam butterfly valve of claim 1, further comprising:
an actuator operably connected to the cam shaft to cause rotation; and
a reduction gearbox operatively coupled to the actuator gear reduce a rotational actuation and to assert a closing bias during cryogenic cool down.

11. The cam butterfly valve of claim 1, further comprising:
an actuator operably connected to the cam shaft to cause rotation; and
a closing torsional biasing mechanism coupled to the actuator to assert a closing bias during cryogenic cool down.

12. A cryogenic cam butterfly valve, comprising:
a body including an axially extending fluid conduit formed there through;
a valve seat projecting from the body annularly within the fluid conduit;
a cam shaft having a cam of circular cross section, disposed transverse to an axis of the fluid conduit, and mounted within the body to rotate about a shaft axis;
a valve disc having a seating surface that corresponds in a closed position to the valve seat of the body;
a disc lug connected to a back side of the valve disc and having a circular bore that receives and is larger than the cam of the cam shaft, the valve disc rotatable for a quarter turn within the body about a lug axis that is offset from the shaft axis; and
at least one torsion spring mounted concentrically on the cam shaft with one spring leg against the valve disc having a preload of sufficient torque to cause the valve disc to rigidly move with the cam shaft;
a biasing mechanism operatively coupled to the cam shaft, wherein actuating the cam shaft in the closing rotational direction first causes the camming side of the cam of the cam shaft to rotate the disc lug and the valve disc a quarter turn from the open position to the closed position and further actuating causes the camming side of the cam shaft to translate the valve disc into sealed contact at an ambient temperature with the valve seat, said valve disc being translated by the force of the valve disc against the valve seat,
wherein the biasing mechanism asserts a closing bias rotation to the cam shaft to cause additional translation to maintain the sealed contact during cool down to a cryogenic temperature, and
wherein actuating the cam shall in an opening rotational direction first causes the camming side of the cam of the cam shaft to reverse translate the valve disc to unseal from the valve seat and continued actuating causes the camming side of the cam shaft to reverse rotate the disc lug and valve disc a quarter turn from the closed position to the open position.

13. The cryogenic cam butterfly valve of claim 12, wherein the at least one torsion spring comprises an austenitic nickel-chromium-based superalloy.

14. The cryogenic cam butterfly valve of claim 12, wherein the cam shaft has a second cam of circular cross section that moves in unison with the first cam, the cam butterfly valve further comprising a second disc lug connected to a back side of the valve disc and having a circular bore that receives and is larger than the second cam of the cam shaft, the valve disc rotatable for a quarter turn within the body about the lug axis that is offset from the shaft axis.

15. The cryogenic cam butterfly valve of claim 12, wherein the valve disc comprises a triple offset design with the cam shaft offset from a plane made from the seating surface, wherein the shaft axis is offset from a body centerline of the body, and wherein the seating surface on disc has a slanted cone shape.

16. The cryogenic cam butterfly valve of claim 12, wherein the valve seat comprises a static valve seat.

17. The cryogenic cam butterfly valve of claim 16, wherein the static valve seat comprises a conical ring attached to the valve body.

18. The cryogenic cam butterfly valve of claim 12, wherein the fluid conduit contains a cryogenic fluid, the wherein further actuating of causes the camming side of the cam shaft to translate the valve disc a first amount into sealed contact with the valve seat at an ambient temperature and to translate the valve disc a second amount into sealed contact with the valve seat at a cryogenic temperature.

19. The cryogenic cam butterfly valve of claim 12, wherein actuating the cam shaft comprises a rotation of 0-90° and further actuating the cam shaft comprises an additional rotation of 90° to approximately 135° to thereby translate the valve disc towards the valve seat thereby creating a tight seal.

* * * * *